US011307303B2

(12) United States Patent
Kimura

(10) Patent No.: US 11,307,303 B2
(45) Date of Patent: Apr. 19, 2022

(54) GROUND CONTROL POINT DEVICE AND SAR DISPLACEMENT MEASURING SYSTEM

(71) Applicant: NEC CORPORATION, Tokyo (JP)

(72) Inventor: Tsunekazu Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 390 days.

(21) Appl. No.: 16/590,432

(22) Filed: Oct. 2, 2019

(65) Prior Publication Data

US 2020/0110171 A1 Apr. 9, 2020

(30) Foreign Application Priority Data

Oct. 3, 2018 (JP) .............................. JP2018-187986

(51) Int. Cl.
*G01S 13/90* (2006.01)
*G01S 7/02* (2006.01)
*H01Q 15/18* (2006.01)
*G01S 7/41* (2006.01)
*G01S 19/07* (2010.01)

(52) U.S. Cl.
CPC .......... *G01S 13/9011* (2013.01); *G01S 7/025* (2013.01); *G01S 7/411* (2013.01); *G01S 13/9023* (2013.01); *G01S 13/9076* (2019.05); *G01S 19/07* (2013.01); *H01Q 15/18* (2013.01)

(58) Field of Classification Search
CPC .. G01S 13/9011; G01S 13/9076; G01S 7/025; G01S 7/411; G01S 13/9023; G01S 19/07; H01Q 15/18
See application file for complete search history.

(56) References Cited

FOREIGN PATENT DOCUMENTS

| DE | 202018006600 U1 | * | 6/2021 | .......... G01S 7/4021 |
|---|---|---|---|---|
| EP | 2 284 569 A1 | | 2/2011 | |
| EP | 2 585 850 | | 5/2013 | |
| JP | 2001-091650 A | | 4/2001 | |
| JP | 2005-098994 A | | 4/2005 | |
| JP | 2009-236545 A | | 10/2009 | |
| JP | 2009236545 A | * | 10/2009 | |
| JP | 2019220905 A | * | 12/2019 | |
| WO | 2012/000796 A1 | | 1/2012 | |

* cited by examiner

*Primary Examiner* — Vladimir Magloire
*Assistant Examiner* — Nazra Nur Waheed
(74) *Attorney, Agent, or Firm* — Sughrue Mion, PLLC

(57) ABSTRACT

A ground control point device includes an SAR wave reflector configured to receive an SAR wave incident from an SAR in an incident direction and to reflect the SAR wave in the incident direction; a GNSS receiver configured to receive a GNSS wave to generate, based on the GNSS wave, time information and positional information indicative of a position of a control point; an SAR wave receiver configured to receive the SAR wave; and a control point data generator/transmitter configured to generate control point data obtained by associating the positional information when the SAR receiver receives the SAR wave with a time instant of reception of the SAR wave that is determined based on the time information, and to transmit the control point data to outside.

20 Claims, 2 Drawing Sheets

[SAR OBSERVATION DATA]

| OBSERVATION POINT ID | TIME INSTANT OF RECEPTION OF SAR REFLECTED WAVE | IMAGE INFORMATION |
|---|---|---|

↕ MATCHING

[CONTROL POINT DATA]

| CONTROL POINT ID | TIME INSTANT OF RECEPTION OF SAR WAVE | POSITIONAL INFORMATION |
|---|---|---|

FIG. 2

GROUND CONTROL POINT DEVICE AND SAR DISPLACEMENT MEASURING SYSTEM

This application is based upon and claims the benefit of priority from Japanese patent application No. 2018-187986, filed on Oct. 3, 2018, the disclosure of which is incorporated herein in its entirety by reference.

BACKGROUND OF THE INVENTION

Field of the Invention

This invention relates to a ground control point device and an SAR displacement measuring system.

Description of the Related Art

As a displacement measuring systems using an artificial satellite or other flying objects, there are known a global navigation satellite system (GNSS) such as a global positioning system (GPS), and a synthetic aperture radar (SAR) displacement measuring system which performs an SAR analysis such as a persistent scatterer interferometry synthetic aperture radar (PS-InSAR) analysis.

The SAR displacement measuring system may sometimes use a ground control point device including a corner reflector (CR) to receive a microwave (SAR wave) transmitted from a flying object and incident to the corner reflector in an incident direction and to reflect the SAR wave in the incident direction, for example, in case where it is difficult to use a natural geographical feature, a building, or the like as a ground control point. In the SAR displacement measuring system, the GNSS may be used in combination in order to obtain an absolute position of the ground control point such as a longitude, a latitude, an altitude, and so on.

Technologies related to an SAR displacement measuring system are disclosed in, for example, JP 2009-236545 A (Patent Literature 1), JP 2005-098994 A (Patent Literature 2), JP 2001-091650 A (Patent Literature 3), EP 2284569 A1 (Patent Literature 4), WO 2012/000796 A1 (Patent Literature 5), and EP 2585850 A1 (Patent Literature 6).

Incidentally, in the SAR displacement measuring system of this type including those disclosed in Patent Literatures 2 to 6, it is necessary, in carrying out the SAR analysis, to identify a ground control point device corresponding to an observation area. In such identification, respective positions of a plurality of ground control point devices installed at various locations must be identified with respect to a series of SAR reflected wave data which may also be called an enormous quantity of image data. Thus, the identification takes a lot of time and effort if it is manually performed.

Patent Literature 1 discloses an image processing system (displacement measuring system) utilizing an SAR. The image processing system disclosed in Patent Literature 1 includes the SAR mounted on an artificial satellite or the like, a GPS satellite (GNSS artificial satellite) group, electronic control points (ground control point devices) installed on the surface of the earth, a ground station configured to receive reflected wave data (SAR observation data) from the SAR, and an SAR image processing facility (observation base station or geodetic information processing device). Each of the electronic control points is provided with a radio frequency identification (RFID) tag, and outputs identifier information (control point device ID) unique to each electronic control point as a microwave when the SAR wave reaches the electronic control point. The SAR receives the microwave from the RFID tag together with a reflected wave from the surface of the earth, and transmits to the ground station the reflected wave data which is time-series data comprising a mixture of observation information based on the reflected wave from the surface of the earth and the identifier information from the RFID tag.

With the image processing system disclosed in Patent Literature 1, it is not necessary to manually conduct processing of identifying the ground control point device corresponding to the observation area. However, in the reflected wave data transmitted from the flying object to the ground station, the identifier information from the RFID tag serving as positional information on the ground control point device is mixed with the observation information based on the reflected wave from the surface of the earth. Therefore, prior to the SAR analysis, the SAR image processing facility on the ground is required to conduct processing of separating or extracting the identifier information on the ground control point device from the reflected wave data in which the observation information and the identifier information are mixed. This processing is required to accurately discriminate the observation information and the identifier information from each other. On the other hand, the identifier information output from the RFID tag on the ground as a radio wave is received by the SAR installed on the flying object in the sky, and then transmitted from the SAR to the ground station as the radio wave. Therefore, there is a possibility that the identifier information is affected by noise in the course of transmission.

In view of the above, it is desired to efficiently and accurately identify the ground control point device corresponding to the observation area.

SUMMARY OF THE INVENTION

It is an object of this invention to provide a technology for solving the above-mentioned problem, and to provide a ground control point device contributing to efficient and accurate identification of a ground control point device corresponding to an observation area in an SAR displacement measuring system.

It is another object of this invention to provide an SAR displacement measuring system including the above-mentioned ground control point device.

According to an aspect of this invention, there is provided a ground control point device installed at a control point of a synthetic aperture radar (SAR) displacement measuring system which performs an SAR analysis, the ground control point device comprising an SAR wave reflector configured to receive an SAR wave incident from an SAR in an incident direction and to reflect the SAR wave in the incident direction; a global navigation satellite system (GNSS) receiver configured to receive a GNSS wave to generate, based on the GNSS wave, time information and positional information indicative of a position of the control point; an SAR wave receiver configured to receive the SAR wave; and a control point data generator/transmitter configured to generate control point data obtained by associating the positional information when the SAR receiver receives the SAR wave with a time instant of reception of the SAR wave that is determined based on the time information, and to transmit the control point data to outside.

According to another aspect of this invention, there is provided a synthetic aperture radar (SAR) displacement measuring system, comprising an SAR which is installed in a flying object and which is configured to transmit an SAR wave to an observation area on the surface of the earth, to receive a reflected wave of the SAR wave, to generate SAR observation data obtained by associating image information based on the received reflected wave with a time instant of reception of the reflected wave of the SAR wave and an observation area ID unique to the observation area at the time instant of reception, and to transmit the SAR observation data toward the ground; the ground control point device; a ground station configured to receive the SAR observation data transmitted from the SAR and to transmit the SAR observation data to outside; and a geodetic information processing device configured to match the SAR observation data transmitted from the ground station and the control point data transmitted from the ground control point device with each other on the basis of the respective time instants of reception, the observation area ID, and the control point ID, and to conduct an SAR analysis based on the SAR observation data and the control point data matched with each other.

BRIEF DESCRIPTION OF THE DRAWINGS

FIG. 2 is a conceptual diagram of SAR observation data and control point data to be used in the SAR displacement measuring system to which the ground control point device is applied illustrated in FIG. 1.

DESCRIPTION OF THE EMBODIMENTS

Figure 1:
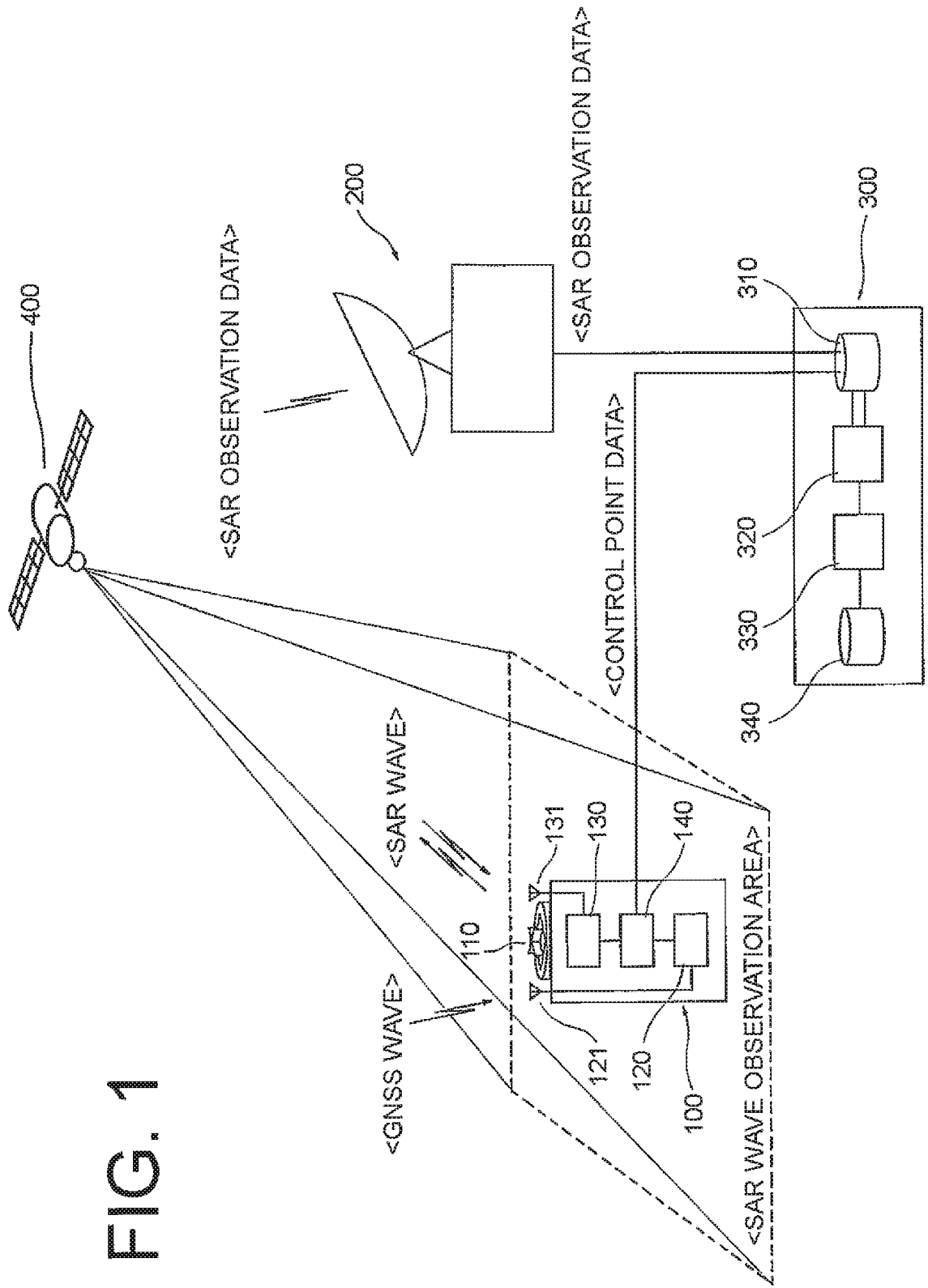
FIG. 1 is a diagram for illustrating a configuration of an SAR displacement measuring system to which a ground control point device according to an embodiment of this invention is applied.

Referring to FIG. 1, an SAR displacement measuring system according to an embodiment of this invention includes an SAR, a ground control point device 100, a ground station 200, and a geodetic information processing device 300. The SAR is installed in an SAR artificial satellite 400 as a flying object, and is configured to transmit an SAR wave to an observation area on the surface of the earth, to receive a reflected wave of the SAR wave, to generate SAR observation data containing image information based on the received reflected wave, and to transmit the SAR observation data to the ground. The ground station 200 is configured to receive the SAR observation data transmitted from the SAR artificial satellite 400, and to transmit the SAR observation data to outside. The geodetic information processing device 300 is configured to conduct an SAR analysis based on the SAR observation data transmitted from the ground station 200 and control point data transmitted from the ground control point device 100.

The ground control point device 100 is installed at a control point of the SAR displacement measuring system configured to conduct a synthetic aperture radar (SAR) analysis, and includes an SAR wave reflector 110, a GNSS receiver 120, an SAR wave receiver 130, and a control point data generator/transmitter 140. In FIG. 1, only one ground control point device 100 is illustrated. Actually, however, a plurality of the ground control point devices 100 are installed at desired control points on the surface of the earth.

The SAR wave reflector 110 receives the SAR wave which is a microwave incident from the SAR in an incident direction, and reflects the SAR wave in the incident direction.

The global navigation satellite system (GNSS) receiver 120 receives a GNSS wave and generates, based on the GNSS wave, time information and positional information indicating the position of a control point.

The SAR wave receiver 130 receives the SAR wave.

Referring also to FIG. 2, the control point data generator/transmitter 140 generates control point data obtained by associating the positional information when the SAR wave receiver 130 receives the SAR wave with a time instant of reception of the SAR wave that is determined based on the time information, and transmits the control point data to the geodetic information processing device 300. In FIG. 1, the control data generator/transmitter 140 transmits the control point data to the geodetic information processing device 300 through wired communication. Alternatively, at least a part of a transmission path for the control point data may be replaced by wireless communication.

The ground control point device 100 is assigned with a control point ID unique to the ground control point device. The control point data mentioned above includes the control point ID also.

The SAR wave reflector 110 includes a plurality of (in this example, four) corner reflectors. The four corner reflectors are arranged at equiangular intervals, at 90° intervals in this embodiment, around a vertical line extending in a zenith direction. Each of the four corner reflectors opens laterally and towards a zenith. With this structure, in response to any SAR wave arriving from any direction in a hemisphere centered at the zenith, the SAR wave reflector 110 is able to return the reflected wave in the incident direction, that is, towards the SAR. Accordingly, when the ground control point device 100 is installed, it is only necessary to align a top-bottom direction of the ground control point device 100 along the zenith direction. Thus, without requiring a rotation direction around the zenith direction to be oriented in a particular direction, the ground control point device 100 is excellent in workability upon installation. Furthermore, the ground control point device 100 does not require a mechanism for driving the SAR wave reflector 110 in a panning direction and a tilting direction in accordance with a position of the SAR artificial satellite 400 and, therefore, can be manufactured at a low cost.

The SAR wave receiver 130 includes an SAR antenna 131 adapted to receive the SAR wave.

At least a part of the SAR antenna 131 may be constructed by using a part of the SAR wave reflector 110.

Although not illustrated in the figure, the ground control point device 100 further includes a radome which is made of a material allowing the SAR wave to be transmitted therethrough and which covers a top portion and a side portion of the SAR wave reflector 110. A surface of the radome is subjected to soil-resistant treatment. The radome made of the material allowing the SAR wave to be transmitted therethrough covers the top portion and the side portion of each of the SAR wave reflector 110 and the SAR antenna 131 so as to prevent surfaces of the corner reflectors and the SAR antenna 131 from being contaminated or oxidized to decrease reflection efficiency and reception efficiency for the SAR wave. On the other hand, a GNSS antenna 121 is located outside the radome and at a position where reflection of the SAR wave by the SAR wave reflector 110 is hardly interfered. The GNSS antenna 121 receives GNSS waves from a desired number of GNSS artificial satellites (not shown), and outputs a reception signal to the GNSS receiver 120.

The ground control point device 100 also includes a power supply (not shown) which supplies electric power to the GNSS receiver 120, the SAR wave receiver 130, and the control point data generator/transmitter 140. The power supply may be a commercial power supply or a battery. In particular, when the ground control point device 100 is installed at a place, such as a remote secluded area, where it is difficult to secure a commercial power supply or to maintain the battery, the ground control point device 100 is designed so that power consumption of the GNSS receiver 120, the SAR wave receiver 130, and the control point data generator/transmitter 140 is as small as possible. In addition, a combination of a private power generator such as a solar battery, a geothermal power generation element, or a wind power generator, and a rechargeable battery may be used as the power supply.

The SAR installed in the SAR artificial satellite 400 generates the SAR observation data obtained by associating image information based on the SAR reflected wave with a time instant of reception of the reflected wave of the SAR wave and an observation area ID unique to the observation area at the time instant of reception, and transmit the SAR observation data toward the ground.

The geodetic information processing device 300 includes a pre-analysis data storage unit 310, a data matching unit 320, a data analyzing unit 330, and an analysis result storage unit 340.

The pre-analysis data storage unit 310 temporarily stores the SAR observation data transmitted from the ground station 200 and the control point data transmitted from the ground control point device 100 before carrying out matching between the SAR observation data and the control point data.

The data matching unit 320 matches the SAR observation data transmitted from the ground station 200 and the control point data transmitted from the ground control point device 100 with each other on the basis of the respective time instants of reception, the observation area ID, and the control point ID.

The data analyzing unit 330 conducts the SAR analysis based on the SAR observation data and the control point data matched with each other by the data matching unit 320.

The analysis result storage unit 340 stores a result of the SAR analysis performed by the data analyzing unit 330.

With the above-mentioned configuration, the control point data is automatically transmitted from the control point data generator/transmitter 140 when the ground control point device 100 receives the SAR wave. Thus, it is not necessary to manually conduct processing of identifying the ground control point device 100 corresponding to the observation area. Moreover, the control point data is directly supplied to the geodetic information processing device 300 without being temporarily mixed with the SAR observation data. Accordingly, processing of separating or extracting the control point data from the SAR observation data is not required prior to the SAR analysis. Furthermore, the control point data is directly transmitted from the ground control point device 100 to the geodetic information processing device 300 both of which are installed on the ground, without passing through the SAR artificial satellite 400. Thus, the control point data is less likely to be affected by noise in the course of transmission. As a result, the ground control point device 100 corresponding to the observation area can be efficiently and accurately identified in the SAR displacement measuring system.

What is claimed is:

1. A ground control point device installed at a control point of a synthetic aperture radar (SAR) displacement measuring system which performs an SAR analysis, the ground control point device comprising:
   an SAR wave reflector configured to receive an SAR wave incident from an SAR in an incident direction and to reflect the SAR wave in the incident direction;
   a global navigation satellite system (GNSS) receiver configured to receive a GNSS wave to generate, based on the GNSS wave, time information and positional information indicative of a position of the control point;
   an SAR wave receiver configured to receive the SAR wave; and
   a control point data generator/transmitter configured to generate control point data obtained by associating the positional information when the SAR receiver receives the SAR wave with a time instant of reception of the SAR wave that is determined based on the time information, and to transmit the control point data to outside.

2. The ground control point device according to claim 1, wherein the ground control point device is assigned with a control point ID unique to the ground control point device, and
   wherein the control point data also includes the control point ID.

3. The ground control point device according to claim 1, wherein the SAR wave reflector includes a plurality of corner reflectors, and
   wherein the plurality of corner reflectors are arranged at equiangular intervals from one another around a vertical line extending towards a zenith, and open laterally and towards the zenith.

4. The ground control point device according to claim 2, wherein the SAR wave reflector includes a plurality of corner reflectors, and
   wherein the plurality of corner reflectors are arranged at equiangular intervals from one another around a vertical line extending towards a zenith, and open laterally and towards the zenith.

5. The ground control point device according to claim 1, wherein the SAR wave receiver includes an SAR antenna configured to receive the SAR wave, and
   wherein at least a part of the SAR antenna is constructed using a part of the SAR wave reflector.

6. The ground control point device according to claim 2, wherein the SAR wave receiver includes an SAR antenna configured to receive the SAR wave, and
   wherein at least a part of the SAR antenna is constructed using a part of the SAR wave reflector.

7. The ground control point device according to claim 3, wherein the SAR wave receiver includes an SAR antenna configured to receive the SAR wave, and
   wherein at least a part of the SAR antenna is constructed using a part of the SAR wave reflector.

8. The ground control point device according to claim 4, wherein the SAR wave receiver includes an SAR antenna configured to receive the SAR wave, and
   wherein at least a part of the SAR antenna is constructed using a part of the SAR wave reflector.

9. The ground control point device according to claim 1, further comprising a radome which is made of a material allowing the SAR wave to be transmitted therethrough and which covers a top portion and a side portion of the SAR wave reflector,
   wherein the SAR wave receiver includes an SAR antenna which is mounted in the radome and which is configured to receive the SAR wave, and
   wherein the GNSS receiver includes a GNSS antenna which is installed outside the radome and which is configured to receive the GNSS wave.

10. The ground control point device according to claim 2, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

11. The ground control point device according to claim 3, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

12. The ground control point device according to claim 4, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

13. The ground control point device according to claim 5, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

14. The ground control point device according to claim 6, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

15. The ground control point device according to claim 7, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

16. The ground control point device according to claim 8, further comprising a radome which is made of a material allowing the SAR wave to be transmitted therethrough and which covers a top portion and a side portion of the SAR wave reflector, wherein the SAR wave receiver includes an SAR antenna which is mounted in the radome and which is configured to receive the SAR wave, and wherein the GNSS receiver includes a GNSS antenna which is installed outside the radome and which is configured to receive the GNSS wave.

17. A synthetic aperture radar (SAR) displacement measuring system, comprising:

an SAR which is installed in a flying object and which is configured to transmit an SAR wave to an observation area on the surface of the earth, to receive a reflected wave of the SAR wave, to generate SAR observation data obtained by associating image information based on the received reflected wave with a time instant of reception of the reflected wave of the SAR wave and an observation area ID unique to the observation area at the time instant of reception, and to transmit the SAR observation data toward the ground;

the ground control point device according to claim 1;

a ground station configured to receive the SAR observation data transmitted from the SAR and to transmit the SAR observation data to outside; and a geodetic information processing device configured to match the SAR observation data transmitted from the ground station and the control point data transmitted from the ground control point device with each other on the basis of the respective time instants of reception, the observation area ID, and the control point ID, and to conduct an SAR analysis based on the SAR observation data and the control point data matched with each other.

18. A synthetic aperture radar (SAR) displacement measuring system, comprising:

an SAR which is installed in a flying object and which is configured to transmit an SAR wave to an observation area on the surface of the earth, to receive a reflected wave of the SAR wave, to generate SAR observation data obtained by associating image information based on the received reflected wave with a time instant of reception of the reflected wave of the SAR wave and an observation area ID unique to the observation area at the time instant of reception, and to transmit the SAR observation data toward the ground;

the ground control point device according to claim 2;

a ground station configured to receive the SAR observation data transmitted from the SAR and to transmit the SAR observation data to outside; and a geodetic information processing device configured to match the SAR observation data transmitted from the ground station and the control point data transmitted from the ground control point device with each other on the basis of the respective time instants of reception, the observation area ID, and the control point ID, and to conduct an SAR analysis based on the SAR observation data and the control point data matched with each other.

19. A synthetic aperture radar (SAR) displacement measuring system, comprising:

an SAR which is installed in a flying object and which is configured to transmit an SAR wave to an observation area on the surface of the earth, to receive a reflected wave of the SAR wave, to generate SAR observation data obtained by associating image information based on the received reflected wave with a time instant of reception of the reflected wave of the SAR wave and an observation area ID unique to the observation area at the time instant of reception, and to transmit the SAR observation data toward the ground;

the ground control point device according to claim 3;

a ground station configured to receive the SAR observation data transmitted from the SAR and to transmit the SAR observation data to outside; and a geodetic information processing device configured to match the SAR observation data transmitted from the ground station and the control point data transmitted from the ground control point device with each other on the basis of the respective time instants of reception, the observation area ID, and the control point ID, and to conduct an SAR analysis based on the SAR observation data and the control point data matched with each other.

20. The SAR displacement measuring system according to claim 17, wherein the geodetic information processing device includes a pre-analysis data storage unit configured to temporarily store the SAR observation data transmitted from the ground station and the control point data transmitted from the ground control point device before carrying out matching between the SAR observation data and the control point data.

\* \* \* \* \*